US010981839B2

(12) United States Patent
Geiger et al.

(10) Patent No.: US 10,981,839 B2
(45) Date of Patent: Apr. 20, 2021

(54) PROCESS OF CONVERTING POTASSIUM SULFATE TO POTASSIUM HYDROGEN SULFATE

(71) Applicant: Compass Minerals USA Inc., Overland Park, KS (US)

(72) Inventors: Robert A. Geiger, Olathe, KS (US); Kristopher Lee Shelite, Moundridge, KS (US); Steffen M. Ball, Kansas City, MO (US); Vatren Jurin, Overland Park, KS (US)

(73) Assignee: Compass Minerals USA Inc., Overland Park, KS (US)

( * ) Notice: Subject to any disclaimer, the term of this patent is extended or adjusted under 35 U.S.C. 154(b) by 0 days.

(21) Appl. No.: 16/677,305

(22) Filed: Nov. 7, 2019

(65) Prior Publication Data

US 2020/0140347 A1 May 7, 2020

Related U.S. Application Data

(60) Provisional application No. 62/756,887, filed on Nov. 7, 2018.

(51) Int. Cl.
  *C05D 1/02* (2006.01)
  *C05D 9/02* (2006.01)
  *C05F 11/02* (2006.01)

(52) U.S. Cl.
  CPC .............. *C05D 1/02* (2013.01); *C05D 9/02* (2013.01); *C05F 11/02* (2013.01)

(58) Field of Classification Search
  None
  See application file for complete search history.

(56) References Cited

U.S. PATENT DOCUMENTS

| | | | | |
|---|---|---|---|---|
| 2,082,809 A | * | 6/1937 | Pennell | C05D 3/00 423/518 |
| 3,049,417 A | * | 8/1962 | Bradley | C05B 11/06 71/37 |
| 3,770,411 A | | 11/1973 | Chambers et al. | |
| 3,932,166 A | * | 1/1976 | Vignovich | C05D 1/02 71/11 |

(Continued)

FOREIGN PATENT DOCUMENTS

| CN | 1115749 | 1/1996 |
|---|---|---|
| CN | 104030757 | 9/2014 |

(Continued)

OTHER PUBLICATIONS

Search Report and Written Opinion dated Apr. 10, 2020 in corresponding PCT/US2019/060309 filed Nov. 7, 2019, 10 pages.

(Continued)

*Primary Examiner* — Wayne A Langel
(74) *Attorney, Agent, or Firm* — Hovey Williams LLP (57) ABSTRACT

The present disclosure provides a method of increasing the concentration of $K_2O$ in an aqueous solution. The method comprises reacting potassium sulfate with an acidic compound to yield a product that includes potassium hydrogen sulfate. The product can be used to supplement crops in need of potassium. The product can also have other nutrients added to it, depending on the desired end use. Advantageously, these products increase yield as compared to prior art products.

37 Claims, 6 Drawing Sheets

(56) References Cited

U.S. PATENT DOCUMENTS

| | | | |
|---|---|---|---|
| 5,034,045 A | 7/1991 | Alexander | |
| 5,298,050 A | 3/1994 | McLaughlin et al. | |
| 5,663,425 A | 9/1997 | Detroit et al. | |
| 5,735,929 A | 4/1998 | McLaughlin | |
| 6,080,220 A | 6/2000 | Sequi et al. | |
| 7,780,941 B1 * | 8/2010 | Lalancette | C05D 1/02 423/544 |
| 2014/0179520 A1 | 6/2014 | Haschemeyer | |

FOREIGN PATENT DOCUMENTS

| | | |
|---|---|---|
| CN | 104230433 | 12/2014 |
| CN | 105622258 | 6/2016 |
| CN | 106278693 | 1/2017 |

OTHER PUBLICATIONS

Machine Translation in English of CN105622258, 12 pages.
Machine Translation in English of CN1115749, 4 pages.
Machine Translation in English of CN106278693, 9 pages.
Machine Translation in English of CN104030757, 10 pages.
Machine Translation in English of CN104230433, 16 pages.

* cited by examiner

PROCESS OF CONVERTING POTASSIUM SULFATE TO POTASSIUM HYDROGEN SULFATE

RELATED APPLICATIONS

The present application claims the priority benefit of U.S. Provisional Patent Application Ser. No. 62/756,887, filed Nov. 7, 2018, entitled PROCESS OF CONVERTING POTASSIUM SULFATE TO POTASSIUM HYDROGEN SULFATE, incorporated by reference in its entirety herein.

BACKGROUND

Field

The present disclosure relates broadly to methods of increasing the concentration of $K_2O$ in aqueous solutions.

Description of Related Art

Potassium sulfate, potassium chloride, and potassium nitrate are all used as sources of potassium in fertilizer products. Potassium sulfate is appealing because it does not include chlorides, plus it is relatively inexpensive. However, potassium sulfate has limited solubility in water, thus limiting its agricultural usefulness. There is a need for methods of increasing the solubility of potassium sulfate in aqueous solutions.

SUMMARY

In one embodiment, the disclosure is concerned with a method of increasing the $K_2O$ available in an aqueous solution. The method comprises reacting potassium sulfate with an acidic compound to yield a product comprising potassium hydrogen sulfate.

In another embodiment, the disclosure is directed towards the product resulting from reacting potassium sulfate with an acidic compound in an aqueous environment.

In another embodiment, the disclosure is concerned with a fertilizer product comprising a mixture of potassium hydrogen sulfate and a compound selected from the group consisting of:
(I) a polymer comprising recurring monomers having one or more —OK moieties;
(II) a humate comprising moieties of —$SO_3^-K^+$; and
(III) (I) and (II).

In yet a further embodiment, the disclosure is concerned with a method of providing nutrients to a seed or plant by contacting a fertilizer product with a seed, a plant, and/or soil. The fertilizer product comprises a mixture of potassium hydrogen sulfate and a compound selected from the group consisting of:
(I) a polymer comprising recurring monomers having one or more —OK moieties;
(II) a humate comprising moieties of —$SO_3^-K^+$; and
(III) (I) and (II).

BRIEF DESCRIPTION OF THE DRAWINGS

FIG. 8(*a*) is a graph of the yield of onions grown with the Example 4 formulation at different $K_2O$ rates as compared to a control and a comparative formula (Example 7); and FIG. 8(*b*) is a graph similar to that of FIG. 8(*a*) but in bar form.

DETAILED DESCRIPTION

The present disclosure provides a method of increasing the concentration of $K_2O$ in an aqueous solution by reacting potassium sulfate ("SOP") with an acidic compound. This reaction preferably yields a product comprising potassium hydrogen sulfate.

It will be appreciated that potassium solubility is commonly measured in terms of $K_2O$ solubility. Thus, "potassium solubility" and "$K_2O$ solubility" are used interchangeably herein, as are "potassium concentration" and "$K_2O$ concentration."

1. Ingredients

Potassium sulfate is generally provided at levels of from about 10% to about 25% by weight, preferably from about 10% to about 20% by weight, and more preferably from about 11% to about 15% by weight, based on the total weight of all ingredients used to make the aqueous product taken as 100% by weight.

The acidic compound preferably has a pH of less than about 5.5, preferably from about 1 to about 5.5, and more preferably from about 4 to about 5.5, in a 50% water solution or suspension. Preferably, the acidic compound(s) is provided at levels of from about 1% to about 25% by weight, preferably from about 2% to about 20% by weight, and more preferably from about 3% to about 15% by weight, based on the total weight of all ingredients used to make the aqueous product taken as 100% by weight. Preferred acidic compounds comprise recurring monomers that include moieties selected from the group consisting of hydroxys, carboxys, sulfites, and combinations thereof. Examples of particularly preferred acidic compounds are acidic polymers, acidic humates, and mixtures thereof.

Preferred acidic polymers have a weight average molecular weight of from about 1,000 Daltons to about 10,000 Daltons, preferably from about 2,000 Daltons to about 7,500 Daltons, and more preferably from about 3,000 Daltons to about 5,000 Daltons. Preferred acidic polymers comprise monomers including a hydroxy group, carboxy group, sulfite group, and/or combinations thereof. Preferably these groups are on at least about 50% of the polymer's monomers, more preferably at least about 75% the polymer's monomers, and even more preferably on at least 95% of the polymer's monomers. Examples of some polymers meeting this description include polyacrylic acid, poly(maleic acid), copolymers of polyacrylic acid (e.g., poly(acrylic acid-co-maleic acid)), and combinations thereof.

Suitable acidic humates are soluble at a pH of less than about 7, preferably less than about 6.5, and more preferably less than about 6. In another embodiment, suitable acidic humates are soluble at a pH of from about 1 to about 7, preferably from about 1 to about 6.5, and more preferably from about 1 to about 6. A preferred acid-soluble humate includes a modified humic acid, such as one where sulfoalkylated groups have been added to humic acid under alkaline conditions. This is described in U.S. Pat. No. 5,663,425, incorporated by reference herein. A particularly preferred acidic humate is potassium humate.

In embodiments where the acidic compound is an acidic humate, the weight ratio of potassium sulfate to acidic humate is from about 1.75:1 to about 3:1, preferably from about 2:1 to about 2.5:1, and more preferably about 2.25:1.

In one embodiment, potassium sulfate is reacted with both an acidic polymer and an acidic humate. In one such instance, it is preferred that the weight ratio of acidic humate to acidic polymer is from about 5.5:1 to about 10:1, preferably from about 6.5:1 to about 8.5:1, and more preferably about 7.5:1. In another instance, the acidic humate is provided at levels of from about 1% to about 15% by weight, preferably from about 2% to about 12% by weight, and more preferably from about 3% to about 10% by weight, based on the total weight of all ingredients used to make the aqueous product taken as 100% by weight, while the acidic polymer is provided at levels of from about 0.1% to about 7% by weight, preferably from about 0.5% to about 5% by weight, and more preferably from about 0.5% to about 3% by weight, based on the total weight of all ingredients used to make the aqueous product taken as 100% by weight.

In a further embodiment, a conversion agent (e.g., boric acid) and/or a stabilizing agent (e.g., ammonium nitrate) may be utilized. In the latter embodiment, the weight ratio of potassium sulfate to stabilizing agent is preferably from about 2:1 to about 5:1, more preferably from about 2.5:1 to about 4.5:1, and even more preferably about 3.4:1. In another embodiment, the stabilizing agent is provided at levels of from about 1% to about 15% by weight, preferably from about 2% to about 12% by weight, and more preferably from about 3% to about 10% by weight, based on the total weight of all ingredients used to make the aqueous product taken as 100% by weight.

One preferred formula according to this disclosure comprises:

| COMPONENT | W/W (%) |
|---|---|
| Potassium Sulfate | about 14 to about 18 |
| Potassium Humate | about 3 to about 10 |
| Acidic Polymer (MW ~3,000 to 5,000 Daltons) | about 0.5 to about 3 |
| Water | about 59 to about 79.5 |
| $NH_4NO_3$ | about 3 to about 10 |

In one embodiment, the ingredients used with the method consist essentially of, or even consist of, potassium sulfate, an acidic compound, and water.

In another embodiment, the ingredients used with the method consist essentially of, or even consist of, potassium sulfate, an acidic compound, water, and ammonium nitrate.

In a further embodiment, the ingredients used with the method consist essentially of, or even consist of, potassium sulfate, an acidic polymer, an acidic humate, and water.

In yet a further embodiment, the ingredients used with the method consist essentially of, or even consist of, potassium sulfate, potassium humate, an acidic polymer (preferably a polyacrylic acid), and water.

It will be appreciated that the above-described $K_2O$ product can be used as is, or in a concentrated or diluted form, depending upon the user's needs. Advantageously, further ingredients (e.g., plant nutrients) can be added to the product. Preferred plant nutrients include micronutrients, macronutrients, and mixtures thereof "Micronutrient" refers to elements typically required in small or trace amounts for plant growth, with preferred micronutrients including nickel, copper, zinc, manganese, boron, iron, cobalt, selenium, molybdenum, and/or mixtures thereof, and/or sources of the foregoing. "Macronutrient" refers to elements typically required in large quantities for plant growth, with preferred macronutrients including calcium, sulfur, phosphorus, magnesium, potassium, nitrogen, sodium, and/or mixtures thereof, and/or sources of the foregoing. In both instances, a "source" of a macronutrient or micronutrient is meant to refer to a compound containing the element (e.g., $CaCO_3$) or the element itself (e.g., Ca), unless stated otherwise.

Table A provides some exemplary ranges for instances where one or more plant nutrients are included in the $K_2O$ product. Depending upon agricultural needs, the total level of micronutrients other than potassium will typically be from about 1% to about 5% by weight, based on the weight of the final aqueous product.

TABLE A

| PLANT NUTRIENT* | BROADEST RANGE** | PREFERRED** | MOST PREFERRED** |
|---|---|---|---|
| Calcium (Ca) | about 0.001% to about 5% | about 0.01% to about 4% | about 0.01% to about 2% |
| Sulfur (S) | about 0.001% to about 5% | about 0.01% to about 4% | about 0.01% to about 2% |
| Phosphorus (P) | about 0.001% to about 5% | about 0.01% to about 4% | about 0.01% to about 2% |
| Magnesium (Mg) | about 0.001% to about 5% | about 0.01% to about 4% | about 0.01% to about 2% |
| Nitrogen (N) | about 0.001% to about 5% | about 0.01% to about 4% | about 0.01% to about 2% |
| Sodium (Na) | about 0.001% to about 5% | about 0.01% to about 4% | about 0.01% to about 2% |
| Nickel (Ni) | about 0.001% to about 5% | about 0.01 to about 2% | about 0.01% to about 1% |
| Copper (Cu) | about 0.001% to about 5% | about 0.01% to about 2% | about 0.01% to about 1% |
| Zinc (Zn) | about 0.001% to about 5% | about 0.01% to about 2% | about 0.01% to about 1% |
| Manganese (Mn) | about 0.001% to about 5% | about 0.01% to about 2% | about 0.01% to about 1% |
| Boron (B) | about 0.001% to about 5% | about 0.01% to about 2% | about 0.01% to about 1% |
| Iron (Fe) | about 0.001% to about 5% | about 0.01% to about 2% | about 0.01% to about 1% |
| Cobalt (Co) | about 0.001% to about 5% | about 0.01% to about 2% | about 0.01% to about 1% |
| Selenium (Se) | about 0.001% to about 5% | about 0.01% to about 2% | about 0.01% to about 1% |
| Molybdenum (Mo) | about 0.001% to about 5% | about 0.01 to about 2% | about 0.01% to about 1% |

*In embodiments where the particular nutrient is present (i.e., when it is not 0%).
**All ranges refer to the weight of the target nutrient rather than the source of the target nutrient, with % by weight being based upon the total weight of the aqueous $K_2O$ product taken as 100% by weight.

2. Reaction Conditions

The reaction of potassium sulfate with an acidic compound is carried out by mixing the foregoing ingredients in an aqueous environment. In one embodiment, a mixture of the acidic polymer(s) and acidic humate(s) is formed first, and potassium sulfate is added to the mixture. Regardless, the previously described conversion agent and/or thermal stabilizing agent can be present during the reacting and/or one or both can be added to the product after reacting.

Water is preferably present in the reaction environment at a level of from about 55% to about 85% by weight, more preferably from about 59% to about 80% by weight, and even more preferably from about 64% to about 70% by weight, based upon the total weight of all components present in the aqueous environment taken as 100% by weight. The balance of the ingredients in the reaction environment will be those described previously, and at the ratios also described previously.

It is preferred that the reaction is carried out under heated conditions. More particularly, the reaction is carried out at a temperature of at least about 80° C., preferably from about 80° C. to about 130° C., more preferably from about 90° C. to about 110° C., and even more preferably from about 95° C. to about 100° C. Preferred reaction times include at least about 15 minutes, preferably from about 15 minutes to about 45 minutes, more preferably from about 20 minutes to about 40 minutes, and even more preferably from about 27 minutes to about 32 minutes.

The general reaction can be depicted as follows:

compared to prior art products. That is, the product comprises at least about 8% by weight dissolved $K_2O$, preferably at least about 9% by weight dissolved $K_2O$, more preferably at least about 10% by weight dissolved $K_2O$, even more preferably at least about 10.5% by weight dissolved $K_2O$, and most preferably at least about 12% by weight dissolved $K_2O$, based upon the total weight of the product taken as 100% by weight.

In another embodiment, potassium hydrogen sulfate is present at sufficient levels so that said product comprises from about 8% by weight to about 25% by weight dissolved $K_2O$, preferably from about 9% by weight to about 25% by weight dissolved $K_2O$, more preferably from about 10% by weight to about 20% by weight dissolved $K_2O$, even more preferably from about 10.5% by weight to about 20% by weight dissolved $K_2O$, and most preferably from about 12%

In one embodiment and as can be seen in the above reaction scheme, the acidic compound comprises both an acidic polymer and an acidic humate, and during the reacting at least some potassium atoms from the potassium sulfate replace at least some hydrogen atoms from the acidic polymer and at least some hydrogen atoms from the acidic humate. This results in the formation of a high-density potassium polymer and potassium-substituted humate.

In another embodiment, potassium sulfate reacts with one of the acidic polymer or acidic humate to yield a product comprising a first quantity of potassium hydrogen sulfate, followed by reacting with the other of the acidic polymer or acidic humate with potassium sulfate to yield a product comprising further a second or final quantity of potassium hydrogen sulfate that is larger than said first quantity of potassium hydrogen sulfate.

Advantageously, the reaction according to this disclosure results in the solubility of potassium sulfate (measured as $K_2O$) being increased by at least about 100%, preferably at least about 140%, and more preferably at least about 170%. In another embodiment, the solubility of $K_2O$ is increased by from about 100% to about 250%, preferably from about 140% to about 225%, more preferably from about 170% to about 200%, and even more preferably about 175%.

Because of this increased solubility, the product formed from the foregoing reaction is an aqueous mixture comprising higher levels of dissolved potassium hydrogen sulfate as by weight to about 20% by weight dissolved $K_2O$, based upon the total weight of the product taken as 100% by weight.

In one embodiment, the reaction ingredients and/or the final aqueous product are substantially free of surfactants. That is, the reaction ingredients and/or the final aqueous product comprise less than about 0.5% by weight surfactants, preferably less than about 0.1% by weight, more preferably less than about 0.05% by weight, and even more preferably about 0% by weight, based on the total weight of the reaction ingredients or final aqueous product taken as 100% by weight.

In another embodiment, the reaction ingredients and/or the final aqueous product are substantially free of potassium nitrate. That is, the reaction ingredients and/or the final aqueous product comprise less than about 0.5% by weight potassium nitrate, preferably less than about 0.1% by weight, and more preferably about 0% by weight, based on the total weight of the reaction ingredients or final aqueous product taken as 100% by weight.

In a further embodiment, the reaction ingredients and/or the final aqueous product are substantially free of potassium chloride. That is, the reaction ingredients and/or the final aqueous product comprise less than about 0.5% by weight potassium chloride, preferably less than about 0.1% by weight, and more preferably about 0% by weight, based on the total weight of the reaction ingredients or final aqueous product taken as 100% by weight.

In a further embodiment, the reaction ingredients and/or the final aqueous product have relatively low levels of magnesium, or are even free or substantially free of magnesium. That is, the reaction ingredients and/or the final aqueous product comprise less than about 5% by weight magnesium, preferably less than about 2% by weight, more preferably less than about 0.5% by weight, and more preferably about 0% by weight, based on the total weight of the reaction ingredients or final aqueous product taken as 100% by weight.

A number of advantages are achieved with the present method and resulting product, in addition to increasing in potassium sulfate solubility in water. For example, the thermodynamic wall that disfavors the conversion of potassium sulfate to potassium hydrogen sulfate is overcome using the present disclosure, and thus the conversion to potassium hydrogen sulfate is stabilized even at extremely low temperatures (e.g., about 32° F.).

The uptake of potassium onto the acidic polymer (e.g., polyacrylic acid and acid-soluble humate (e.g., potassium humate) creates a high-density polymer/macromolecule with potassium. This high-density potassium molecule can increase the absorption of potassium into plants grown with a product according to the disclosure.

The present disclosure also has advantages in drop irrigation applications. For example, the higher thermal stability means the product will not salt out during cold months. Additionally, the low pH (5.5 pH) humate complex will enhance absorption due to the pH value being similar to the pH of root hairs.

A further advantage is an improvement in fruit and vegetable yield and mass of fruits and vegetables grown with a product according to the disclosure. For example, fruits such as cherries, apples, and pears grown using a product according to this disclosure will have an increased mass yield of at least about 7% (average per 100 units of the fruit), preferably at least about 15%, and more preferably at least about 20% as compared to an NPK control or to a formulation from U.S. Pat. No. 5,298,050.

Vegetables such as corn or onions grown using a product according to this disclosure will result in an increased mass yield of at least about 10% (average per 100 units of the vegetable), preferably at least about 20%, more preferably at least about 35%, and even more preferably at least about 45%, as compared to an NPK control or to a formulation from U.S. Pat. No. 5,298,050.

Another advantage of the present disclosure is the improvement in plant growth. The improvement in plant growth can be measured by plant height, root diameter, and/or overall plant mass. For example, at 5 days after planting, the average plant height (determined as described in the Examples) of plants grown with the disclosed product will be at least about 3% taller, preferably at least about 5% taller, and more preferably at least about 6% taller, when compared to a plant grown with an NPK control or with humate alone and grown in the same environment (including same pot size, if applicable) and under the same conditions as the test. The roots will also be healthier and more robust. At 5 days after planting, the average root diameter (determined as described in the Examples) of plants grown with the disclosed product will be at least about 1% greater, preferably at least about 2% greater, and more preferably at least about 3% greater, when compared to a plant grown with an NPK control or with humate alone and grown in the same environment (including same pot size, if applicable) and under the same conditions as the test.

Additional advantages of the various embodiments of the disclosure will be apparent to those skilled in the art upon review of the disclosure herein. It will be appreciated that the various embodiments described herein are not necessarily mutually exclusive unless otherwise indicated herein. For example, a feature described or depicted in one embodiment may also be included in other embodiments but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the disclosure. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

Example 1

Polymer Blend Screening

Figure 1:
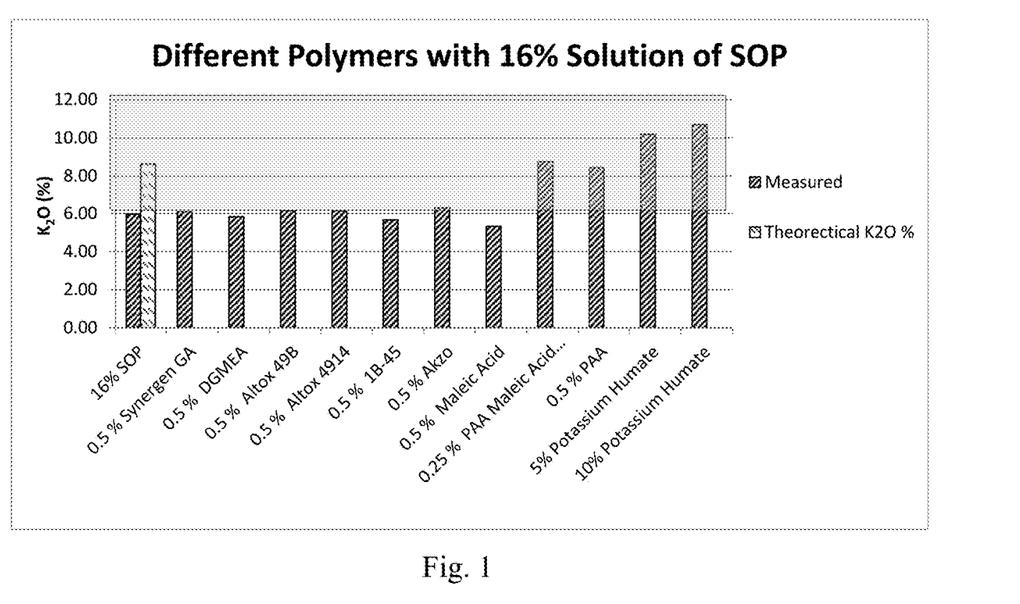
FIG. 1 is a graph showing the measured $K_2O$ in each of several sample solutions (Example 1)

In this procedure, 16 grams of potassium sulfate were dissolved in 83.5, 79, or 74 grams of water in a 100-ml flask. Next, 0.5 grams of the particular test polymer, 5% potassium humate (BorreGro HA-1, obtained from LignoTech AGRO), or 10% potassium humate was added respectively. The solution was heated to 95° C. and stirred for 30 minutes. The solution was allowed to sit for 24 hours after which an aliquot was removed, filtered, and used to determine $K_2O$ percentage of the solution using ICP-OES. These results are shown in FIG. 1.

Example 2

Determining Potassium Sulfate Saturation Point

Figure 2:
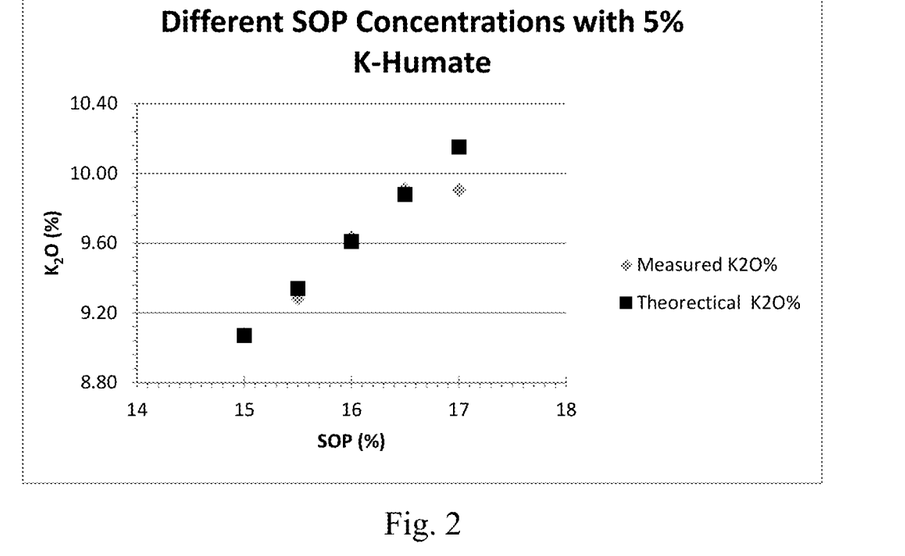
FIG. 2 is a graph providing the measured $K_2O$ in each of several sample solutions where the potassium sulfate levels were varied (Example 2)

Similar preparation/mixing procedures as described in Example 1 were followed (except as otherwise stated) using a low molecular weight polyacrylic acid (MW=3,000; Aquatreat AR 921A, available from AkzoNobel). In each test sample, the polyacrylic acid was utilized at a level of 2% by weight, while the potassium sulfate level was varied from 15% to 17% by weight and the potassium humate (BorreGro HA-1) level was 5% by weight. The $K_2O$ percentage in each solution was also determined as described in Example 1, with FIG. 2 providing those results.

Example 3

Determining Potassium Humate Saturation Point

Figure 3:
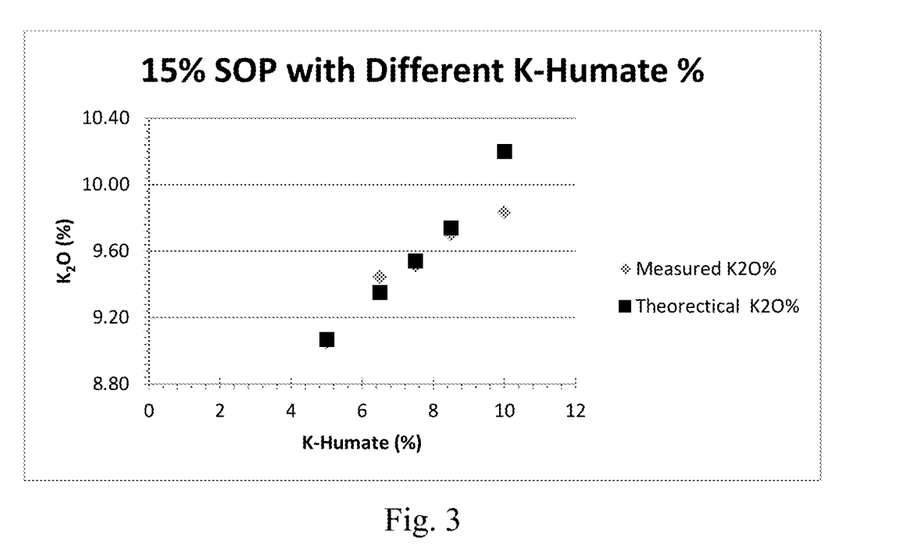
FIG. 3 is a graph providing the measured $K_2O$ in each of several sample solutions where the potassium humate levels were varied (Example 3)

Similar preparation/mixing procedures as described in Example 1 were followed (except as otherwise stated) using a low molecular weight polyacrylic acid (MW=3,000; Aquatreat AR 921A, available from AkzoNobel). In each test sample, the polyacrylic acid was utilized at a level of 2% by weight, while the potassium humate (BorreGro HA-1) was varied from 5% to 10% by weight, and the potassium sulfate level was 16% by weight. The $K_2O$ percentage in each solution was also determined as described in Example 1, with FIG. 3 providing those results.

Example 4

Exemplary Blend

In this Example, 15.93 grams of potassium sulfate were dissolved in 66.48 grams of water in a 200-ml flask. Next, 1.85 grams of polyacrylic acid (Aquatreat AR 921A) and 6.94 grams of potassium humate (BorreGro HA-1) were added to the solution and dissolved. The solution was heated to 95° C. and stirred for 30 minutes. After the reaction was complete, the heat was removed, and 7.87 grams of ammonium nitrate solution (AN-20, available from Calamco) and 0.93 grams of boric acid was added, followed by stirring for 15 minutes.

Example 5

Low-Temperature Studies

Figure 4:
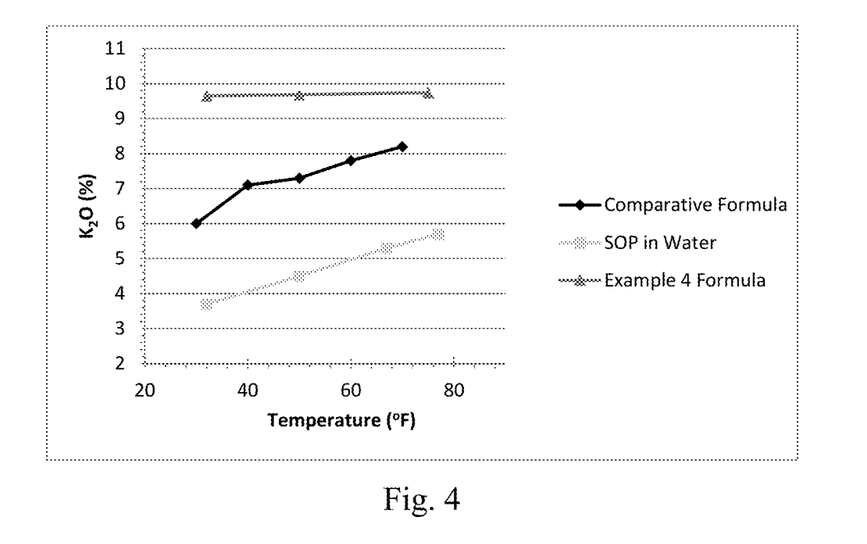
FIG. 4 is a graph depicting the results of the low-temperature study of Example 5.

A low-temperature study was carried out using a control (SOP in water), the Example 4 formulation, and a comparative formulation from U.S. Pat. No. 5,298,050. In this procedure, 100 ml of the particular sample were placed in a cold bath at 0° C. and 10° C. After 24 hours, an aliquot of the sample was removed, filtered, and used to determine the $K_2O$ percentage of the solution using ICP-OES. These results are reported in FIG. 4.

Example 6

Growth Chamber Studies

Growth chamber studies were completed to assess the shoot length, biomass, and root diameter of corn after 5 days.
1. Growth Chamber Test Blend Formulations The test blends included an NPK control, a comparative formulation from U.S. Pat. No. 5,298,050, and four different, commercially-available potassium humate products. The latter products were BorreGro HA-1; a potassium humate product available from HuminTech (Germany); GrowPlex (Earthgreen Products, Inc., Dallas, Tex.); and Humi[K] (Humic Growth Solutions, Jacksonville, Fla.).

An application solution was prepared by taking the particular test formulation and diluting it with DI water. For the humic study (FIGS. 5-6), the solutions were diluted to give an equivalent of 2 lbs. of humic per acre (i.e., 2.24 kg/ha). For the potassium study (FIG. 7), the particular solution was diluted to give 5 lbs., 25 lbs., or 50 lbs. of $K_2O$ per acre (i.e., 5.6 kg/ha, 28.02 kg/ha, and 56.04 kg/ha, respectively). Each treated pot received 10 ml of the particular application solution.
2. Growth Chamber Studies The test plant was planted in a 12 oz cup that was filled with 200 grams of topsoil and sand (50:50 using American Topsoil). A base fertilizer of 100-50-50 (water solution that is made from urea, potassium sulfate, and monoammonium phosphate) per acre was applied per pot before planting. Approximately 10 mL of water was added per day. Each test plant received the same environmental exposure during growth. After 5 days, shoot length, biomass, and root diameter were analyzed as follows:
  a. Shoot Length Shoot length was determined by measuring the length of a single plant from the soil to the end point furthest from the stem or stalk of the highest leaf. This was done on five plants from each test plant type, and the average of those five measurements was calculated and reported as the plant height for that particular treatment.
  b. Plant Biomass The tissue and root mass of each test plant was determined by drying the above- and below-ground biomass for 12 hours at 220° C., then weighing each plant to the third decimal in grams. The values were used to determine nutritional uptake.
  c. Root Diameter Root diameter was determined by measuring the diameter using calipers at 5 different points of the radicle root of a single plant. This was done on five plants from each test plant type, and the average of those five measurements was calculated and reported as the root diameter for that particular treatment.

Figure 5:
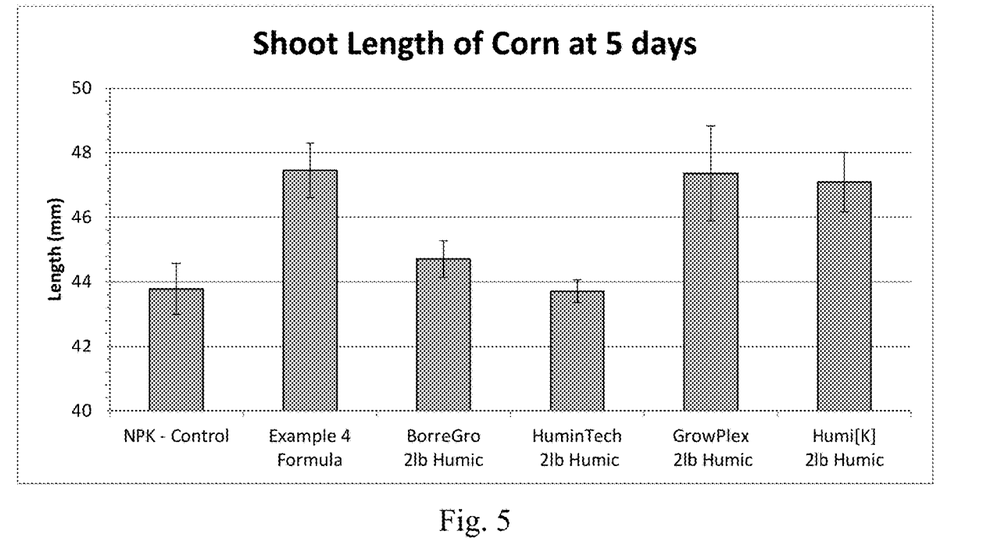
FIG. 5 is a graph showing the shoot length of corn grown as described in Example 6.
Figure 6:
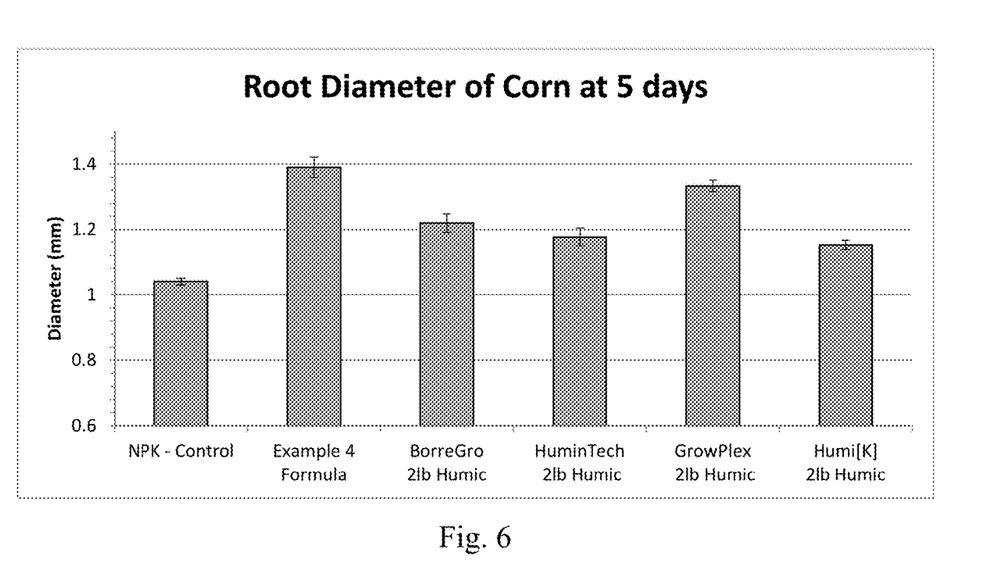
FIG. 6 is a graph depicting the root diameter of corn grown as described in Example 6.
Figure 7:
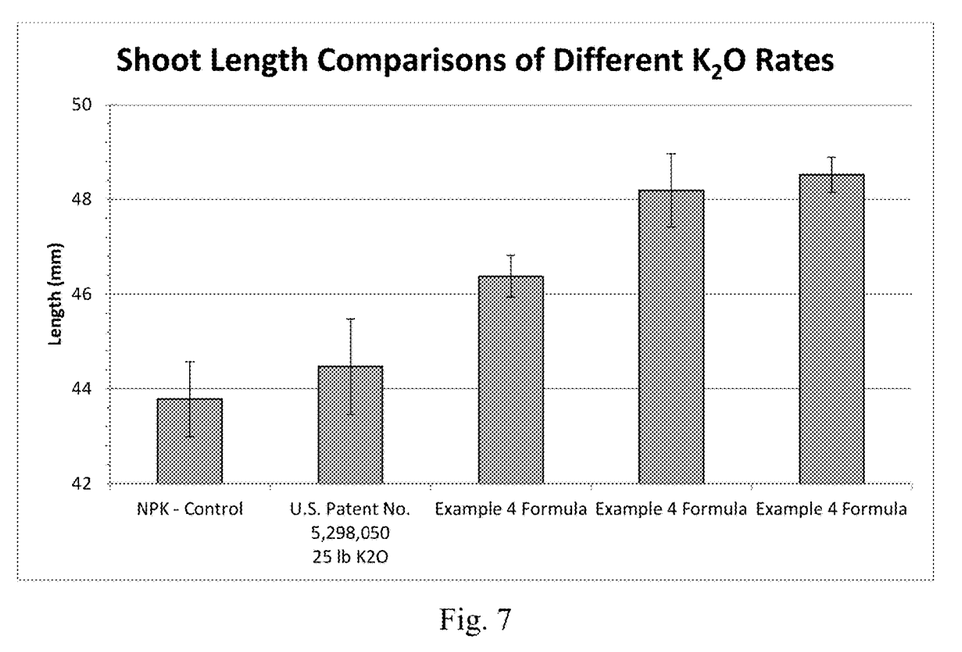
FIG. 7 is a graph showing the shoot length of corn grown using different $K_2O$ rates (Example 6)

FIGS. 5-6 show the shoot length and root diameter results for the different potassium humate sources as compared to a control and to the Example 4 formulation. FIG. 7 shows the shoot length of a control and a comparative formulation along with comparing how the shoot length changed as the $K_2O$ rate of the Example 4 formulation was varied.

Of the types of potassium humate tested, only the Example 4 formulation had observable root hair on all samples. BorreGro had root hair on 2 out 6 samples, and GrowPlex had root hair on 1 out of 6 samples. The other potassium humate samples didn't have observable root hair. Additionally, Example 4 outperformed BorreGro, which was the source in the Example 4 formulation, thus demonstrating the synergistic effects of that formulation. Finally, the Example 4 formulation, GrowPlex, and Humi[K] samples had similar shoot lengths, but the Example 4 formulation plants had healthier/stronger roots.

Example 7

Field Trials

For all field trials, the grower of that particular crop used their standard practice for that crop and field location. The Example 4 blend (undiluted) was applied at 25 lbs. $K_2O$ per acre (28.02 kg/ha) except for with the control.
1. Fruits Table 1 shows the results achieved with several different crops.

TABLE 1

| | Field Trial Data | | |
|---|---|---|---|
| CROP | APPLICATION | YIELD-MASS CHANGE (%) | FRUIT DIAMETER CHANGE (%) |
| Skeena Cherries | Drip | +17.0 | +9.6 |
| Ambrosia Apple | Drip | +23.8 | +6.2 |
| Red Gala Apple | Drip | +1.2 | +0.8 |
| Bartlett Pears | Drip | +6.9 | +3.2 |
| D'Anjou Pears | Drip | +15.0 | +9.0 |

The cherries grown with the Example 4 formulation as compared to the control were more uniform, sweeter (11% sweeter using refractometer averages), and darker in color. The cherries grown with the Example 4 formulation were also larger than the control. That is, the 92% of the control cherries, which were grown using the particular grower's standard practices, ranged in size from 1.10-1.234 inches (27.9-31.3 mm) while 92% of the cherries grown with the Example 4 formulation ranged in size from 1.23-1.35 inches (31.2-34.3 mm). Overall, this led to a 17% increase in yield (weight of 100 cherries).

2. Onions

Figure 8A:
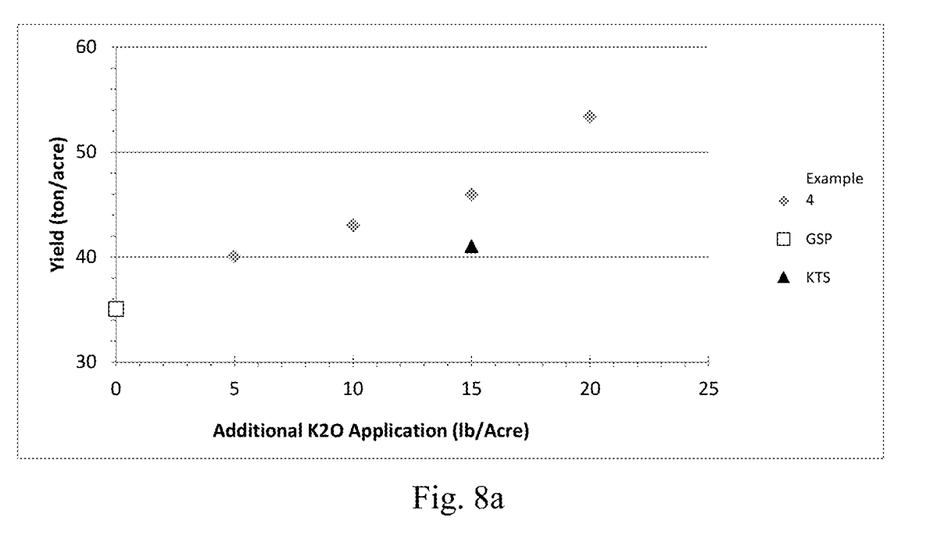
Figure 8B:
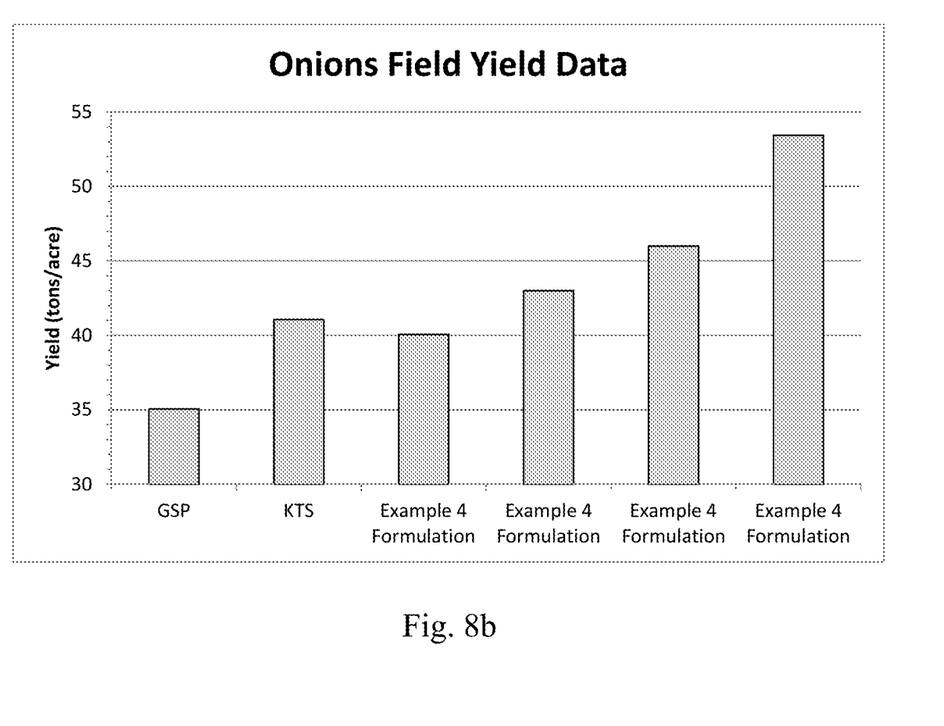

Onions were grown as described above. The control was the grower's standard practice ("GSP"). The testing included onions grown using a comparative formulation ("KTS") as well as onions grown using the Example 4 formulation at different rates: 5 lbs., 10 lbs., 15 lbs., or 25 lbs. of $K_2O$ per acre (i.e., 5.6 kg/ha, 11.2 kg/ha, 16.8 kg/ha, and 28.0 kg/ha, respectively). FIGS. 8(a) and 8(b) give these results. In each instance, the Example 4 formulation led to improvements over the control. Specifically, the Example 4 formulation took the yield from 35 tons/acre to 40, 43, 46, and even 53 tons/acre, which is an increase in yield of from about 14% to about 51%.

Example 8

Additional Formulation and Procedure

In another embodiment of the disclosure, the weight ratios of SOP to potassium humate, potassium humate to polyacrylic acid ("PAA"), and SOP to $NH_4NO_3$ are shown in Table 2. Some preferred product specifications can be found in Table 3.

TABLE 2

| RATIO | APPROXIMATION |
| --- | --- |
| SOP to Potassium Humate | about 2.25:1.00 |
| Potassium Humate to PAA | about 7.5:1.00 |
| SOP to $NH_4NO_3$ | about 3.42:1.00 |

TABLE 3

PRODUCT SPECIFICATIONS

| Chemical Properties - | | Physical Properties - | |
| --- | --- | --- | --- |
| Potash ($K_2O$) | about 10% | Color | Black |
| Nitrogen (N) | about 2% | Weight Per Gallon | about 10 lb. |
| Sulfur | about 3.6% | pH of solution | about 5.25 |
| Carbon | about 2.25% | | |
| Boron | about 0.16% | | |

Another embodiment is shown in Table 4.

TABLE 4

Product Preparation
Per one 1 ton of finished product

| Raw Input | Lbs. Per Ton | % Wt. Solution |
| --- | --- | --- |
| Potassium Sulfate - 17IX | about 318.60 | about 15.93 |
| Ammonium Nitrate (An-20) | about 157.40 | about 7.87 |
| Aquatreat AR 921A | about 37.00 | about 1.85 |

TABLE 4-continued

Product Preparation
Per one 1 ton of finished product

| Raw Input | Lbs. Per Ton | % Wt. Solution |
| --- | --- | --- |
| BorreGro HA-1 | about 138.80 | about 6.94 |
| Boric Acid | about 18.60 | about 0.93 |
| Water | about 1329.60 | about 66.48 |

The mixing procedure for this formulation was:
Step 1: Add water to the mixing vessel and begin heating to about 95° C.
Step 2: Turn on agitator (possibly a recirculation pump) and add Aquatreat AR 921A.
Step 3: Add BorreGro HA-1 and mix for about 5 minutes.
Step 4: Slowly add potassium sulfate-17× and mix for about 30 minutes at about 95° C.
Step 5: Turn off heating and add ammonium nitrate (AN-20) & boric acid and continue agitation for about 30 minutes.
Step 6: Pump solution into decant tank using screen filter (about 20 to about 40 mesh).
Step 7: Allow solution to sit undisturbed for about 8 to about 12 hours prior to decanting solution
Step 8: Decant on a 100-micron filter
Step 9: Take a small sample and send to CMP for lab analysis, if desired

We claim:

1. A method of forming a fertilizer product, said method comprising reacting potassium sulfate with an acidic compound to yield the fertilizer product, wherein:
   said acidic compound comprises recurring monomers selected from the group consisting of hydroxys, carboxys, sulfites, and combinations thereof; and
   said fertilizer product comprises a mixture of potassium hydrogen sulfate and a compound selected from the group consisting of:
   (I) a polymer comprising recurring monomers having one or more —OK moieties;
   (II) a humate comprising moieties of —$SO_3^-K^+$; and
   (III) (I) and (II).

2. The method of claim 1, wherein said acidic compound is selected from the group consisting of acidic polymers, acidic humates, and mixtures thereof.

3. The method of claim 2, wherein said acidic polymer is selected from the group consisting of polyacrylic acid, poly(maleic acid), poly(acrylic acid-co-maleic acid), and combinations thereof.

4. The method of claim 2, wherein said acidic humate is soluble at a pH of less than about 7.

5. The method of claim 2, wherein said acidic humate is soluble at a pH of from about 1 to about 7.

6. The method of claim 2, wherein said acidic humate is potassium humate.

7. The method of claim 1, wherein said acidic compound has a pH of less than about 5.5 in a 50% water solution or suspension.

8. The method of claim 2, wherein said acidic polymer has a weight average molecular weight of from about 1,000 to about 10,000 Daltons.

9. The method of claim 1, wherein said reacting is carried out in an aqueous environment, wherein water is preferably present in said environment at a level of from about 55% to about 85% by weight, based upon the total weight of all components present in the aqueous environment taken as 100% by weight.

10. The method of claim 1, wherein said reacting is carried out at a temperature of at least about 80° C.

11. The method of claim 1, wherein said reacting is carried out for at least about 15 minutes.

12. The method of claim 1, wherein said potassium hydrogen sulfate is present at sufficient levels so that said product comprises at least about 8% by weight dissolved $K_2O$, based upon the total weight of the product taken as 100% by weight.

13. The method of claim 1, wherein said potassium hydrogen sulfate is present at sufficient levels so that said product comprises from about 8% by weight to about 25% by weight dissolved $K_2O$, based upon the total weight of the product taken as 100% by weight.

14. The method of claim 2, wherein said acidic compound comprises both said acidic polymer and said acidic humate, and wherein during said reacting at least some potassium atoms from said potassium sulfate replace at least some hydrogen atoms from said acidic polymer and at least some hydrogen atoms from said acidic humate.

15. The method of claim 2, wherein said reacting comprises reacting potassium sulfate with one of said acidic polymer or acidic humate to yield a product comprising a first quantity of potassium hydrogen sulfate, followed by reacting with the other of said acidic polymer or acidic humate with potassium sulfate to yield a product comprising a second quantity of potassium hydrogen sulfate that is larger than said first quantity of potassium hydrogen sulfate.

16. The method of claim 2, wherein said acidic compound is an acidic humate, and the weight ratio of potassium sulfate to said acidic humate is from about 1.75:1 to about 3:1.

17. The method of claim 2, wherein said reacting comprises reacting potassium sulfate with both an acidic polymer and an acidic humate, and the weight ratio of acidic humate to acidic polymer is from about 5.5:1 to about 10:1.

18. The method of claim 2, wherein a conversion and/or thermal stabilizing agent is present during said reacting and/or is added to said product after reacting.

19. The method of claim 18, wherein said stabilizing agent comprises ammonium nitrate.

20. The method of claim 18, wherein the weight ratio of potassium sulfate to stabilizing agent is from about 2:1 to about 5:1.

21. The method of claim 2, further comprising adding a plant nutrient to said product.

22. The method of claim 21, wherein said plant nutrient is selected from the group consisting of micronutrients, macronutrients, and mixtures thereof.

23. The method of claim 22, wherein said micronutrient is selected from the group consisting of nickel, copper, zinc, manganese, boron, iron, cobalt, selenium, molybdenum, and mixtures thereof, and sources of the foregoing.

24. The method of claim 22, wherein said macronutrient is selected from the group consisting of calcium, sulfur, phosphorus, magnesium, potassium, nitrogen, sodium, and mixtures thereof, and sources of the foregoing.

25. The method of claim 1, wherein boric acid is present during said reacting and/or is added to said product after reacting.

26. The method of claim 2, wherein said reacting comprises creating a mixture of said acidic polymer and said acidic humate and adding potassium sulfate to said mixture.

27. A fertilizer product comprising a mixture of potassium hydrogen sulfate and a compound selected from the group consisting of:
(I) a polymer comprising recurring monomers having one or more —OK moieties;
(II) a humate comprising moieties of —$SO_3^-K^+$; and
(III) (I) and (II).

28. The product of claim 27, wherein said product is in the form of an aqueous mixture, and said potassium hydrogen sulfate is present at sufficient levels so that said product comprises at least about 8% by weight dissolved $K_2O$, based upon the total weight of the product taken as 100% by weight.

29. The product of claim 27, wherein said product is in the form of an aqueous mixture, and said potassium hydrogen sulfate is present at sufficient levels so that said product comprises from about 8% by weight to about 25% by weight dissolved $K_2O$, based upon the total weight of the product taken as 100% by weight.

30. The product of claim 27, further comprising a conversion and/or thermal stabilizing agent.

31. The product of claim 30, wherein said stabilizing agent comprises ammonium nitrate.

32. The product of claim 27, further comprising a plant nutrient.

33. The product of claim 32, wherein said plant nutrient is selected from the group consisting of micronutrients, macronutrients, and mixtures thereof.

34. The product of claim 33, wherein said micronutrient is selected from the group consisting of nickel, copper, zinc, manganese, boron, iron, cobalt, selenium, molybdenum, and mixtures thereof, and sources of the foregoing.

35. The product of claim 33, wherein said macronutrient is selected from the group consisting of calcium, sulfur, phosphorus, magnesium, potassium, nitrogen, sodium, and mixtures thereof, and sources of the foregoing.

36. The product of claim 27, further comprising boric acid.

37. A method of providing nutrients to a seed or plant comprising contacting the product of claim 27 with one or more of the following: a seed, a plant, or soil.

* * * * *

UNITED STATES PATENT AND TRADEMARK OFFICE
CERTIFICATE OF CORRECTION

PATENT NO. : 10,981,839 B2
APPLICATION NO. : 16/677305
DATED : April 20, 2021
INVENTOR(S) : Robert A. Geiger et al.

It is certified that error appears in the above-identified patent and that said Letters Patent is hereby corrected as shown below:

In the Claims

In Claim 9, Column 12, Line 63, please delete the term "preferably".

Signed and Sealed this
Eighteenth Day of April, 2023

Katherine Kelly Vidal
*Director of the United States Patent and Trademark Office*